United States Patent [19]
Gardner et al.

[11] 3,983,920
[45] Oct. 5, 1976

[54] PNEUMATIC TIRE

[75] Inventors: James Dennis Gardner, Akron; Robert William Glasscock, Canal Fulton, both of Ohio

[73] Assignee: The Firestone Tire & Rubber Company, Akron, Ohio

[22] Filed: Apr. 2, 1975

[21] Appl. No.: 564,243

[52] U.S. Cl. .................. 152/362 R; 152/330 RF; 152/353 R; 152/362 CS
[51] Int. Cl.² ............... B60C 15/00; B60C 17/00; B60C 13/00
[58] Field of Search ...... 152/330 RF, 330 L, 353 R, 152/353 C, 362 R, 362 CS, 352

[56] References Cited
UNITED STATES PATENTS

| | | | |
|---|---|---|---|
| 1,337,660 | 4/1920 | Killen | 152/353 R |
| 2,037,640 | 4/1936 | MacMillan | 152/362 R |
| 2,874,745 | 2/1959 | Wann | 152/353 R |
| 2,947,342 | 8/1960 | Holloway | 152/362 CS |
| 3,610,310 | 10/1971 | Wittneben | 152/330 RF |
| 3,631,913 | 1/1972 | Boileau | 152/362 R |
| 3,841,375 | 10/1974 | Edwards | 152/330 RF |
| 3,850,218 | 11/1974 | Bertelli et al. | 152/353 C |
| 3,861,438 | 1/1975 | Bertelli et al. | 152/353 C |

*Primary Examiner*—Drayton E. Hoffman

[57] ABSTRACT

This disclosure relates to a pneumatic tire construction which has a decoupled bead latch located axially outwardly of the rim flange in the lower sidewall area of the tire. This decoupled feature of the bead latch is obtained by incorporating a circumferential groove therein, a series of radial grooves therein, or a combination of both. The decoupled bead latch permits it to act independently of the tire body; thereby, lessening the abrasion type of wear (chafing) which occurs on its periphery.

7 Claims, 5 Drawing Figures

PNEUMATIC TIRE

BACKGROUND OF THE INVENTION

The ability of a pneumatic tire to run when it is entirely deflated, while always an important factor, has become an increasingly important factor in the design of pneumatic tires. A great deal of emphasis is now being focused upon this characteristic of a tire due to the effort to conserve out scarce raw materials, the effort to eliminate the spare tire in an automobile and the effort to provide a stable, safe tire construction which can withstand the rigors of being run uninflated for at least a certain distance at a certain minimum speed without destroying the remaining useful life of the tire.

In a prior application (Ser. No. 545,263, filed Jan. 30, 1975) one of the applicants disclosed an improved tire construction designed to facilitate the run-flat characteristic of a tire. This construction comprised a bead latch which is located in the lower sidewall area of the tire radially outwardly and above the position of the rim flange when the tire is mounted on a rim. A substantial portion of the bead latch extends axially outwardly beyond the rim flange for a substantial distance and a portion of this axially outwardly extending portion extends radially inwardly of the rim flange. The bead latch thereby completely engulfs the rim flange. This novel construction prevents the bead from unseating when the tire is run flat, thereby preventing the tire from extensive damage during run-flat operation and yielding a stable run-flat tire which can be driven without undue danger of losing control of the vehicle.

Often when the tire is run under normal conditions of pressure and load, and particularly when the tire is run flat, the bead latch is in contact with the rim flange and an abrasion of the bead latch results which eventually will render the bead latch inoperative; that is, the bead latch will abrade to such an extent that it will not prevent the tire bead from unseating when the tire is run flat. The present invention eliminates a significant amount of this abrasion damage by enabling the bead latch to operate independently of the tire body so that the severe deflection of the tire body is not directly transmitted to the bead latch.

The present invention is an improvement in the bead latch construction disclosed in the above identified prior application. This improvement consists of incorporating means into the bead latch which enables it to act independently of the tire body. This permits the bead latch to perform its function while the tire body is severely deflected without putting a severe load on the bead latch. This mitigates any severe chafing which may occur in prior bead latch constructions.

The decoupled feature of the bead latch of this invention which results in the independent action of the bead latch may be obtained by several ways; by incorporating a circumferential groove in the bead latch, by incorporating a series of radially disposed grooves in the bead latch or by incorporating a combination of the circumferential groove with a series of radial grooves in the bead latch.

The decoupled bead latch facilitates mounting and dismounting of the tire without harming the functionality of the bead latch itself. The primary advantage of the decoupled feature of the bead latch is to lessen the amount of abrasive wear which the periphery of the bead latch encounters when it is touching the rim flange during normal operation and, particularly, when the tire is run flat.

It is an object of this invention to provide a bead latch construction which mitigates the abrasive wear which occurs to the bead latch when the tire is run under normal conditions or run flat.

It is a further object of this invention to provide a bead latch which operates independently of the tire body.

Other objects of the invention are evidenced by the disclosure of the specifics of this construction which follows.

SUMMARY OF THE INVENTION

The novel construction of this invention comprises incorporating a feature in the bead latch which will enable the bead latch to operate independently of the tire body. This means that even if the tire body is severely deflected by the weight of the vehicle, this severe deflection will not be transmitted to the bead latch and will not cause the periphery of the bead latch to apply extensive pressure on the rim flange. This extensive pressure may significantly damage the bead latch by abrading it on the rim flange. The applicants envision the bead latch of this invention to be decoupled from the tire body and the forces which deflect and distort the tire body. The pressure and force applied to the bead latch when the tire is run flat will be absorbed within the latch itself and will not be transmitted to the rim flange by the latch's periphery; thus "decoupling" the bead latch from the forces in the tire body.

The applicants have found that such decoupling and the resulting independents of the bead latch may be obtained by changing the configuration of the axially outer wall of the bead latch from a smooth surface to one in which interruptions are present. These may be in the form of a circumferentially extending groove or grooves, a series of radially extending grooves or a combination of both of these. The applicants envision that the depth, configuration, location or frequency of the interruptions can be varied so long as the bead latch is decoupled from the tire body and acts independently of the distortion forces acting on the tire body. These interruptions absorb the forces and pressure applied to the bead latch and do not allow the pressure to be transmitted to the rim flange.

The applicants have found that the radially disposed grooves are more effective than a circumferential groove when the tire is run flat and that the circumferential groove is more effective in reducing chafing during normal, inflated operation. Therefore, the preferred embodiment contains both the circumferential groove and the radial grooves.

The cross-sectional shape of the decoupling groove is not a limiting factor in this invention. The groove may have any cross-sectional shape so long as it provides the necessary decoupling function and doesn't lead to the creation of flex cracks during operation.

DETAILED DESCRIPTION OF THE INVENTION

Figure 1:
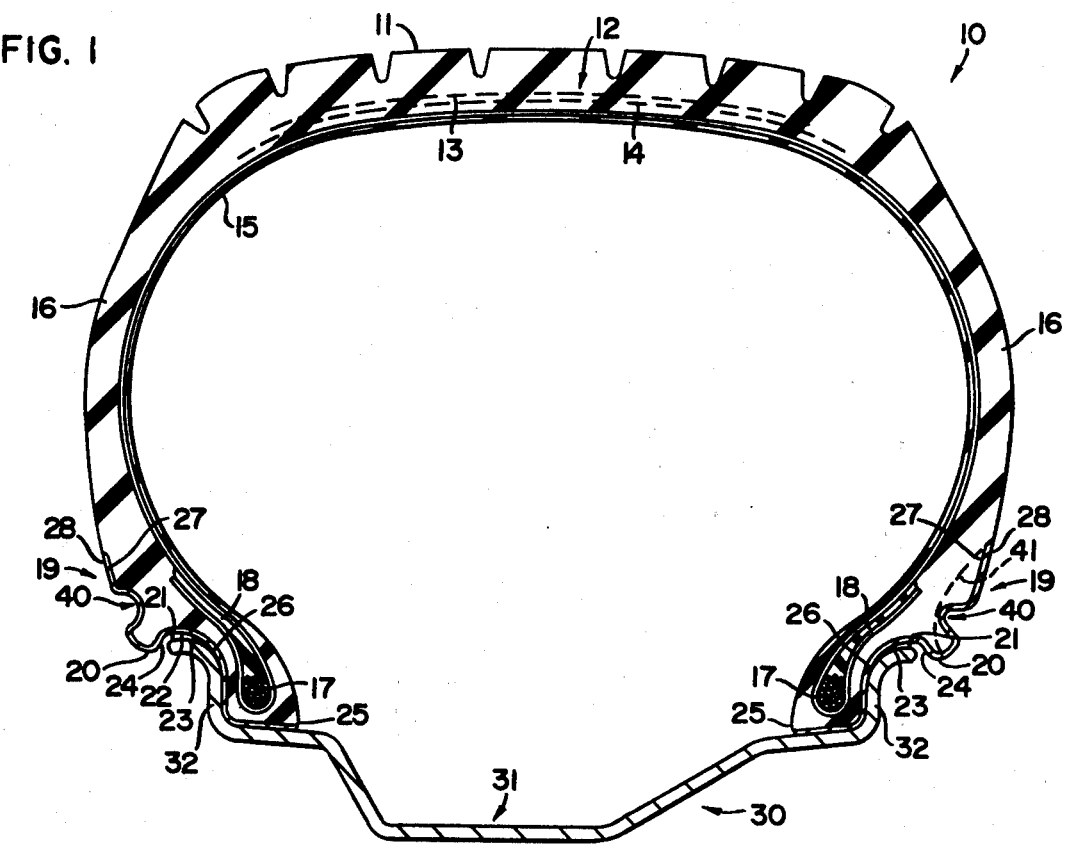
FIG. 1 is a cross-sectional view of a pneumatic tire mounted on a rim showing two embodiments of the present invention, one in the left-hand bead latch and another in the right. This tire is shown in the configuration it would have when inflated and not carrying a load.

As shown in FIG. 1, the tire of this invention is depicted generally as 10 with the rim upon which it is mounted being depicted generally as 30. The rim is a standard drop center rim which is utilized in passenger tires having its drop center area shown generally at 31 and its rim flanges shown generally at 32.

Figure 2:
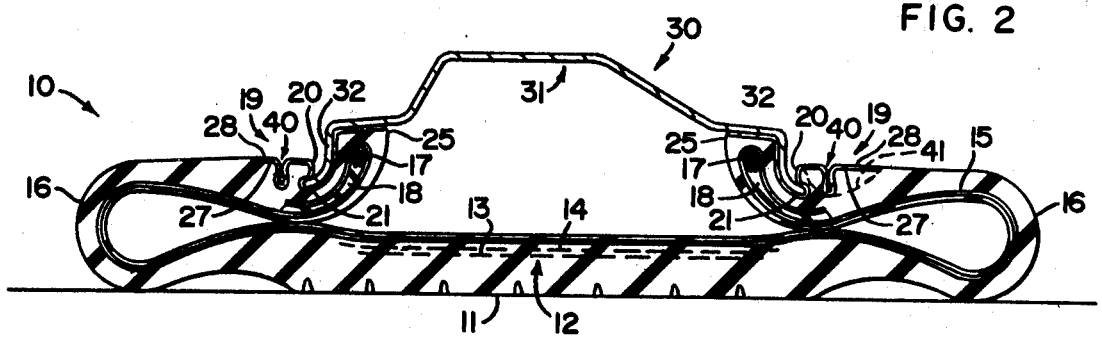
FIG. 2 is a cross-sectional view of the same tire and rim as depicted in FIG. 1 wherein the tire is deflated and under load (its run-flat condition) with the bead latch in operative position completely engulfing the rim flange and absorbing the forces in the tire body so that they are not transmitted to the rim flange.

The tire depicted in FIGS. 1 and 2 is a radial ply passenger tire having a road-engaging thread surface, 11, a stabilizer belt, 12, (comprised of two stabilizer plies, 13 and 14) a body ply, 15, sidewalls, 16, bead rings, 17, and bead fillers, 18, all of known constructions, materials and designs. The bead latch is shown generally at 19.

The bead latch, 19, extends axially outwardly of the rim flange, 32, a substantial distance so that there is a sufficient bulk of the bead latch to engulf and trap the rim flange in the recessed portion, 22, of the bead latch, as shown in FIG. 2. This recessed portion is formed by horizontal wall, 23, and vertical wall, 24. The bead latch also extends axially outwardly and radially inwardly beyond the rim flange so that the diameter of the bead latch measured at 20 (the line from 20-the radially innermost point of the bead latch-to the corresponding point on the bead latch 180 degrees away from 20) is less than the outer diameter of the rim flange measured at the radially outermost point, 21, on the rim (that is, the line from 21 to the corresponding point on the rim flange 180° away from 21). It is preferred that the diameter of the bead latch be at least equal to and preferably even less than the diameter of the inside of the rim flange.

So constructed, the bead latch has a recessed portion, shown generally as 22, having horizontal wall, 23, and vertical wall, 24. This recessed portion is adopted to receive the rim flange when the tire is mounted and under normal operating conditions. The rim and the rim flange will be in contact with the tire bead from the toe of the bead, 25, to a point on the recessed portion of the bead latch. This point is identified as 26 in FIG. 1. Due to the compression exerted by the tire bead axially outwardly on the rim flange, the rim flange is not in contact with the remaining recessed portion of the bead latch when the tire is inflated and unloaded. This feature facilitates the mounting and dismounting of the tire, the placement of the balance weights, and mitigates any abrasion that could occur in the recessed portion of the bead latch and the portion of the bead latch which is located axially outwardly beyond the rim flange. The position of point 26 depends upon the stiffness and construction of the lower sidewall of the tire and the compression of the tire bead on the rim.

When the tire is carrying a normal load usually the entire length of the rim flange will be in contact with the horizontal wall, 23, of the bead latch in the footprint area (the road contact area) of the tire. This action of a portion of the horizontal wall first contacting and then being free of the rim flange can cause abrasion damage to the horizontal wall.

In the foot print area, when the tire is run flat, the entire length of the rim flange is in contact with the horizontal wall of the bead latch. The vertical wall of the bead latch also contacts the rim flange due to the about 90° rotation of the bead latch around the rim flange (see FIG. 2). Both the horizontal and the vertical wall are subject to abrasion. The vertical wall may be entirely abraded away so the bead latch no longer functions to hold the tire bead in place.

In the left-hand bead latch of FIG. 1, the embodiment of the improvement of this invention is shown as a circumferential groove, 40, located in the axially outer wall, 28, of the bead latch, 19. The circumferential groove may or may not be continuous. It must perform the function of decoupling the bead latch from the severe bending forces of the tire body so that the bead latch will operate independently of these forces.

In the right-hand bead latch of FIG. 1, the construction embodying the improvement of this invention is shown as a circumferentially extending groove, 40, and a series of separate radial grooves. One of these radial grooves is shown by the dotted line, 41, in this Figure. This specific embodiment is better defined by FIG. 3.

FIG. 1 shows a chafer strip, 27, located from the bead toe, 25, along the entire periphery of the bead latch to a point on the exterior of the lower sidewall a significant radial distance above the rim flange. It is necessary for this chafer strip to cover this entire area due to the chafing that will occur in the recessed portion of the bead latch and the portion of the bead latch that is located axially outwardly of the rim flange when the tire is run flat. The chafer may, for example, contain cords of nylon monofilament or Kevlar or have no reinforcement. This figure depicts one with no reinforcement. It is envisioned that this chafer strip may be eliminated by the use of the construction of this invention.

FIG. 2 depicts the tire of FIG. 1 when it is deflated and bearing a load, its run-flat condition. As can be seen from FIG. 2, the bead latch 19 has completely engulfed the rim flange, 32, so that, if the bead becomes unseated, it will not be free to move down into the drop center area of the rim. In this engulfing position, the vertical wall has rotated to be positioned on the radially inner side of the rim flange (a rotation of about 90°). A portion of the bead latch is now located radially inwardly of the rim flange which results in the trapping of the rim flange and the securing of the bead to the rim.

FIG. 2 shows the decoupling action of the bead latch of this invention in operation when the tire is in its run-flat position which permits the bead latch to act independently of severe bending forces which are present in the tire body. These severe bending forces are absorbed within the bead latch itself by the rim, 40, closing; thereby lessening the pressure that is applied to the rim flange, 32, by the periphery of the bead latch (walls 23 and 24). The radially disposed grooves, 41, also close, in a similar manner which is not shown, when the tire is run flat. The presence of these interruptions in the axially outer wall of the bead latch thereby greatly mitigates any abrasion wear on the latch.

Figures 3, 4, 5:
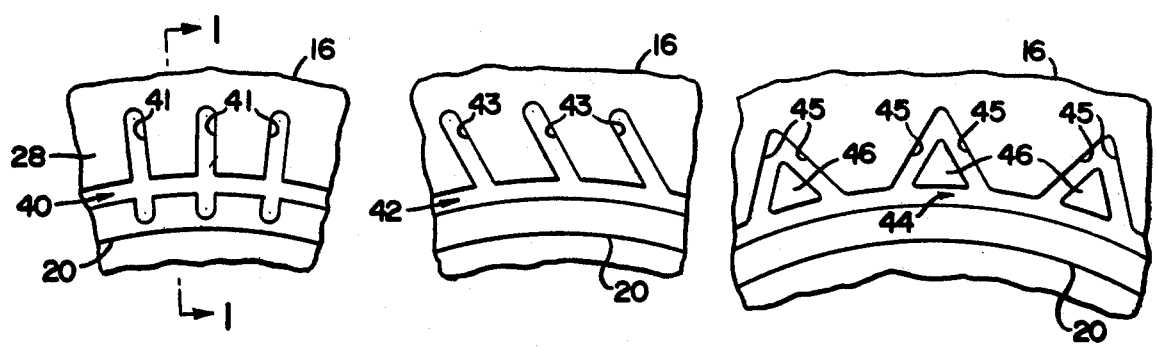
FIG. 3 is a partial side view of the axially outer wall of the embodiment shown in the right-hand bead latch of FIG. 1.
FIGS. 4 and 5 are partial side views of the axially outer wall of two other embodiments of this invention.

FIG. 3 is a partial side view of the axially outer wall in the embodiment shown in the right-hand side of FIG. 1. FIG. 1 shows a cross-sectional view of the FIG. 3 embodiment through the line 1 — 1 in FIG. 3. In FIG. 3 the axially outwardly wall, 28, contains the circumferential groove, 40, and a series of separate radial grooves, 41. The depth, configuration, and spacing of the circumferential groove and radial grooves may be varied so long as the decoupling effect is obtained.

The embodiment shown in FIG. 4 comprises a circumferential groove, 42, and a series of radially disposed grooves, 43. These grooves, 43, may form any convenient angle with the circumferential groove. The depth, cross-sectional shape, spacing and number of the radially disposed grooves and the circumferential groove may be varied so long as the decoupling effect is obtained.

The embodiment shown in FIG. 5 comprises a circumferential groove, 44, and a series of radially disposed grooves, 45. These grooves, 45, are in a series of pairs which converge in the radially outward directly and eventually intersect. These grooves form triangular shapes with the circumferential groove and define a triangular-shaped button, 46. Again, the size, cross-sectional shape, depth and number of these grooves may be varied so long as the decoupling effect is obtained. It is envisioned that the configurations provided by the decoupling interruptions can be used to improve the esthetic appearance of the tire. It is possible to make some of the resulting configurations, such as the triangular-shaped buttons, 46, in FIG. 5 of a different colored (for example, white) rubber compound to improve the esthetic appeal of the tire.

It is understood that another embodiment of this invention may contain only the circumferential groove, 40 (see the left-hand bead latch in FIG. 1). This circumferential groove may be continuous or discontinuous so long as the decoupling feature is obtained. Another such embodiment may contain more than one such circumferential groove.

A further embodiment of this invention may contain only the radial grooves. It is envisioned that these radial grooves could have any cross-sectional shape or spacing so long as the decoupling effect is obtained. The radially disposed grooves could also be placed at an angle to the radial plane of the tire.

The configuration of the interruptions may very throughout the circumferential length of the bead latch and may vary from one bead latch to the other in the same tire.

The applicants have utilized the novel construction of this invention in a BR78-13 size tire. The tire was mounted on a standard rim identified by the industry as a 5.0×13 JJ rim. The diameter of the rim flange was 14.442 inches. The diameter of the bead latch of the construction of this invention when mounted on the rim and inflated was 14.042 inches. The section height of the tire was 5.35 inches and the section width was 8.31 inches, both measured under inflated and unloaded conditions on a 5.0 inch rim. The bead latch extended axially beyond the rim flange a distance of 0.5 inches including a gap of 0.1 inches between the rim flange and the vertical wall of the recess. As the differences in diameters indicate, the bead latch extended radially below the lower surface of the rim flange a distance of about 0.1 inches.

The decoupling embodiment shown in the right-hand bead latch in FIG. 1 was utilized in the tire. In this embodiment, the axially outer wall of the bead latch has a radial length of 1.25 inches measured from the point tangent to the sidewall radius to the radially innermost point on the latch wall. The circumferential groove is 0.20 inches wide with its radially inner edge located 0.25 inches from the radially inner edge located 0.25 inches from the radially inner edge of the axially outer walls of the bead latch. The circumferential groove has tapered walls and a maximum depth of 0.30 inches. The radial grooves are spaced 0.90 inches from one another as measured from the centerline of each groove. These grooves have a width of 0.20 inches, tapered walls and a maximum depth of 0.25 inches. Their radial length is 1.40 inches, with their radially inner edge being 0.25 inches from the radially inner edge of the axially outer wall of the bead latch. The applicants have found that the tire so described functions satisfactorily when run flat with negligible abrasion damage to the periphery of the bead latch whereas a tire of identical construction without the interruptions is severely damaged by abrasion on the rim flange.

This novel construction is particularly suited to radial ply passenger tires. The radial ply tire has better run-flat capabilities than a bias type tire in that the sidewalls in the radial tires are flexible and may bend more radially to get out of the way when the tire is run flat.

We claim:

1. A pneumatic tire comprising an annular, road-engaging tread surface, two sidewalls each connecting a side of said tread surface to an annular bead, and a bead latch member located in the lower sidewall area of each sidewall, said bead latch member having an axially outer wall and a substantially vertical wall, said substantially vertical wall being adapted to receive the rim flange of the rim which said tire is designed to be mounted upon, a portion of said bead latch extending axially outwardly radially inwardly of the rim flange when said tire is mounted on the rim it is designed for, thereby engulfing the rim flange, said axially outer wall of said bead latch member containing at least one groove which extends axially inwardly from said outer wall, said groove designed to collapse in response to the forces acting upon the tire when the tire is run flat or under-inflated thereby permitting said bead latch member to operate independently of said forces.

2. The tire of claim 1 wherein said axially outer wall of said bead latch member contains a series of grooves.

3. The tire of claim 1 wherein said axially outer wall of said bead latch member contains at least one circumferentially extending groove.

4. The tire of claim 1 wherein said axially outer wall of said bead latch member contains at least one circumferentially extending groove and a series of separate, substantially radially extending grooves.

5. The tire of claim 1 wherein said axially outer wall of said bead latch member contains a series of substantially radially extending grooves.

6. The tire of claim 1 wherein said axially outer wall of said bead latch member contains different groove configurations in different areas throughout the circumference of said bead latch member.

7. The tire of claim 1 wherein the axially outer wall of one of said bead latch members contains a different groove configuration than the corresponding bead latch member in the other sidewall.

* * * * *

UNITED STATES PATENT OFFICE
CERTIFICATE OF CORRECTION

Patent No. 3,983,920     Dated October 5, 1976

Inventor(s) James Dennis Gardner & Robert William Glasscock

It is certified that error appears in the above-identified patent and that said Letters Patent are hereby corrected as shown below:

Column 1, line 10, "out" should read --our--;

Column 3, line 17, "thread" should read --tread--;

Column 5, line 41, "very" should bead --vary--;

Column 6, line 4, delete "located 0.25 inches from the radially inner edge";(these words are printed twice)

Column 6, line 24 "tires" should read --tire--.

Signed and Sealed this

Eleventh Day of January 1977

[SEAL]

Attest:

RUTH C. MASON
*Attesting Officer*

C. MARSHALL DANN
*Commissioner of Patents and Trademarks*